United States Patent
Stoll et al.

[15] 3,679,862
[45] July 25, 1972

[54] CORPUSCULAR RADIATION WELDING PROCESS

[72] Inventors: Albert Stoll; Walter Wanka, both of Augsburg-Stadtbergen, Germany

[73] Assignee: Maschinenfabrik Augsberg-Nurnberg AG, Augsberg, Germany

[22] Filed: Nov. 18, 1968

[21] Appl. No.: 845,922

[30] Foreign Application Priority Data

Nov. 17, 1967 Germany......................P 16 65 458.3

[52] U.S. Cl. ......................................219/121 EM, 29/191.2
[51] Int. Cl............................................................B23k 15/00
[58] Field of Search ............................................219/121 EB

*Primary Examiner*—Allen B. Curtis
*Attorney*—Bauer and Goodman

[57] ABSTRACT

A process for welding metal sections in which at least two metal workpieces are welded together across a contact area using corpuscular radiation beams to heat the metal in the respective workpieces adjacent said contact area and form a welded joint. A space is formed in the workpiece in the region of the contact area, the space being positioned within said area in a location in which the corpuscular radiation beams utilized for welding dissipate. A metal tube filled with a corpuscular radiation sink material is placed in said space. Said tube completely fills said space. Corpuscular radiation beams are directed from opposed sides of said joint to weld said workpieces together.

4 Claims, 4 Drawing Figures

PATENTED JUL 25 1972  3,679,862

3,679,862

CORPUSCULAR RADIATION WELDING PROCESS

BACKGROUND OF THE INVENTION

Welding utilizing corpuscular radiation as the energy source to heat the metal has become widespread with the advent of electron beam welding. Other corpuscular radiation such as beams of neutrons, and photons may also be used. In this type of welding, the depth of penetration of the corpuscular radiation, i.e., the penetrating power of the rays, and thus, the maximum depth of welding, is dependent upon the shape of the workpiece, the metal being welded, and the type and energy content of the radiation being applied. The power sources now available for applying corpuscular radiation beams are limited so that only a relatively small thickness of metal can be welded when the radiation is applied from only one side of the joint being welded. Metal joints having thick cross sections must be welded by applying radiation from both sides.

When welding seams from both sides of the metal, it has been found that when the beam of corpuscular radiation does not penetrate through the metal workpiece, but ends, i.e., is dissipated, in the workpiece, pores and/or microfissures are formed in the area where the radiation beam is dissipated. This is particularly severe with materials which are relatively nonductile. This is believed to result from the fact that although the depth of penetration of the radiation is small, i.e., a few tenths of a millimeter, the high speed and energy content of the radiation causes molten metal to vaporize. When the radiation beam has sufficient energy so that it penetrates the metal to which it is applied and emerges from the opposite side of the workpiece, any gaseous material formed is blown out of the metal or else is present in a solid stringer or spout which is subsequently removed.

Unfortunately, when the radiation dissipates in the material being welded, the gaseous matter cannot always be removed promptly. This gaseous matter is entrapped in the solidifying weld metal and forms pores. This area is also characterized by scattering of the radiation beam with consequent scattering of pores.

Microfissures are believed to form in solidified weld metal in the area of the weld when the material being welded is not sufficiently ductile or the construction is such that there is insufficient space to yield, i.e., it cannot contract. The radiation beam is dissipated in such material, and if the basis metal is sufficiently thick or so constructed that contraction is not possible, microfissures are formed. It is often not possible to avoid such microfissures even though proper design expedients are utilized, such as a narrow welding zone or a small volume of molten metal. The present invention provides a process for welding, utilizing corpuscular radiation in which relatively thick-walled metal sections may be welded to form sound joints.

SUMMARY OF THE INVENTION

The present invention provides an improved process for welding metal sections in which at least two metal workpieces are welded together across a contact area using corpuscular radiation beams to heat the metal in the respective workpieces adjacent said contact area and form a welded joint. The corpuscular radiation beams used to heat the metal are applied from opposed sides of the metal workpieces being welded. The improvement in the process comprises forming a space in the interior or the welding gap exclosing the scattering range of the corpuscular beam, said room being filled with any corpuscular radiation sink or protection material. This filled space bridges the workpieces across the contact area. The filled space is also positioned in the area in which the corpuscular radiation beams utilized for welding dissipate. The invention also provides novel thickwalled welded joints formed by the aforestated process and characterized by containing the filled space packed with corpuscular radiation sink material in the interior thereof.

DETAILED DESCRIPTION OF THE INVENTION

The welded joints of the present invention are constructed by cutting out or hollowing out a space, preferably partially in each of the workpieces which will form the welded joint, and filling this space with a corpuscular radiation sink material. The positioning of the filled space may readily be determined for the particular sections of metal to be welded and also for the type, power capacity and setting of the radiation source, preferably electron beam welding, by a series of tests in which the depth to which the corpuscular radiation penetrates is determined. The energy content of the radiation beam may be varied in such tests to determine the strength of the radiation beam desired to accomplish the welding and which will dissipate in the filled space provided. Although such testing is required when working with new equipment and/or different metals and sections, a skilled and experienced operator soon is able to determine the size and position of the filler space with very few, if any, tests. In many instances, the filled space will be provided at a convenient position, often dictated by design and strength considerations, and the radiation beam energy adjusted so that the beam will dissipate in the filled space.

The materials used to pack the "filler space" are those which are resistant to corpuscular radiation and tend to slow down and/or stop the radiation beam. Such materials are referred to herein as "radiation sink materials." They may be the same as the materials to be welded, i.e., carbon steel, low alloy steels, tool steels, heat and corrosion resistant alloys, ultra-high strength steels, ferrous alloys like invar-steel, cobalt-base alloys, nickel-base alloys, copper-base alloys, alloys from aluminum, beryllium, magnesium, titanium, molybdenum, tantalum, tungsten and zircaloy2 (an alloy on the basis of $Al_2O_3$). In the case of copper alloys it should be considered, that copper may diffuse in the ground material, which thereby could embrittle. Suitable are especially materials known in connection with the design and construction of radiation shields. Obviously materials which are operative to shield radiation apparatus, function as radiation sink materials. The preferred radiation sink materials may be relatively soft so that they are readily packed into the space provided. Preferred materials include lead and lead alloys, etc. and pulverous silicates mixed with iron powder. They may be introduced into the hollow space in the form of a paste, in the form of welding powders, i.e., used in U.P. weldings, or such relatively soft metals as those specified hereinbefore. The paste materials may be self-hardening.

Instead of the materials above mentioned also gaseous fluids could be filled or flushed into the hollow space. Such gases could be each inert gas or reduction gases.

Figure 1:
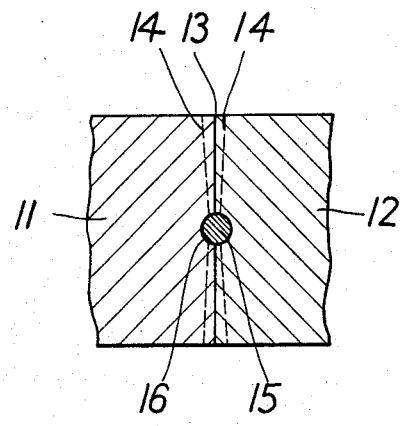
FIG. 1 is a cross-section through a welded joint having the filler space in the form of a sphere which is round in cross-section.
Figure 2:
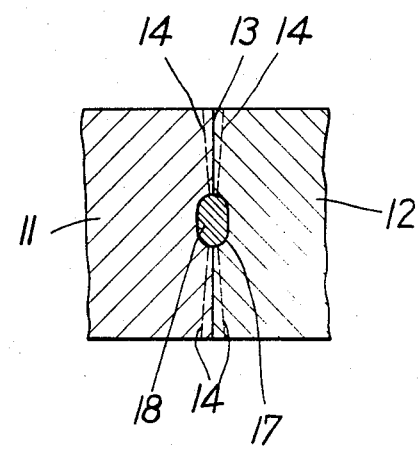
FIG. 2 is a cross-section through a welded joint having the filler space in the form of an elongated space with rounded ends providing an oval cross-section.
Figure 3:
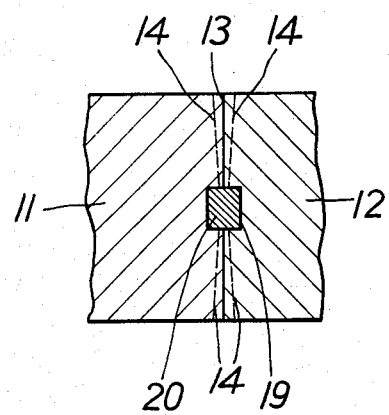
FIG. 3 is a cross-section through a welded joint having the filler space in the form of a parallelepiped with a rectangular cross section.
Figure 4:
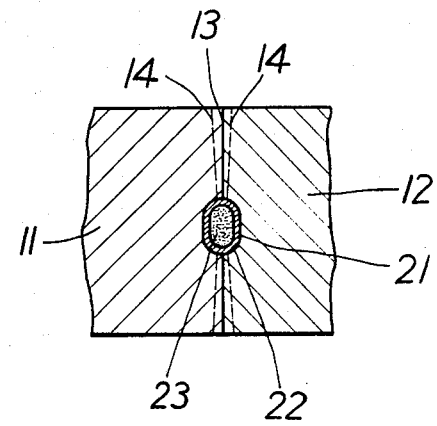
FIG. 4 is a cross-section through a welded joint in which the filler space is outlined with a tubular material providing a walled space packed with radiation sink material.

Each of the four figures represent butt welded joints in which workpiece 11, i.e., of molybdenum-vandium-steel is welded to workpiece 12 of chrome-nickel steel. The solid line 13 separating workpieces 11 and 12 indicates the original line of contact between the two workpieces. Welding as a result of heat acquired from the corpuscular radiation produce a welded seam lying within the area outlined by broken lines 14. The originally hollow spherical space 15 of FIG. 1 is packed with filler material 16. Similarly, the elongated rounded hollow space 17 of FIG. 2 is packed with filler material 18. The box-like hollow space 19 of FIG. 3 is packed with filler material 20. The elongated hollow space 21 of FIG. 4 is outlined by a wall member 22 formed from tube with the interior space thereof packed with filler material 23.

The hollow spaces illustrated which are filled with the radiation sink filler may be formed as grooves in the respective workpieces to be joined extending over a part or all of the length of the welded seam. The filler may be provided in the form of wire. A filled tube containing the radiation sink filler may be packed into the hollow space to provide a filled space such as that illustrated in FIG. 4.

Although the space may have various shapes as described hereinbefore, the preferred shapes are spherical or rounded elongated spaces such as cylindrical spaces having rounded ends, egg-like spaces, etc. These rounded sections are preferred since they do not have sharp angles and, therefore, avoid the undesirable notch effect. The corpuscular radiation welding process utilizing the filled space as described hereinbefore results in the production of a welded joint containing a space filled with radiation sink material. The process may form pores and/or microfissures in the filled spaces utilized to act as the radiation sink. However, such pores and/or microfissures do not have a detrimental effect upon the welded joint products of the present invention, as in each instance, the effects are localized in the filler material. Defects of this type formed during the welding operation, which if formed elsewhere in the welding seam material might cause rupture of the joint, do not have the same detrimental effect because the defect is localized in the filled space and even if it propagates, it terminates in the gap surrounding the filled space.

The welded joints and processes of the present invention are readily distinguished from the welding procesures used to weld turbine blades to a ring or base utilizing gas flame or electric arc welding. In the welding of these turbine blades, a notch is commonly made in the face of the blade or in the complementary base ring, and a projection from the complementary material positioned in the notch, to effect a mechanical lock and to fix the position of the blade during the welding operation. In such operation, even if corpuscular welding radiation is utilized, the area of dissipation of the corpuscular beam is not defined. The two processes are also distinguished in that if corpuscular radiation is utilized, uncontrollable vapor occlusions may form in the workpiece, often with the concomitant or subsequent formation of microfissures. The distinction between this prior art process and the process and product of the present invention are apparent. As many embodiments of this invention may be made without departing from the spirit and scope thereof, it is to be understood that the invention includes all such modifications and variations as come within the scope of the appended claims.

What is claimed is:

1. A process for welding metal sections in which at least two metal workpieces are welded together across a contact area using corpuscular radiation beams to heat the metal in the respective workpieces adjacent said contact area and form a welded joint, comprising
   forming a space in the workpiece in the region of the contact area, the space being positioned within said area in a location in which the corpuscular radiation beams utilized for welding dissipate;
   placing a metal tube filled with a corpuscular radiation sink material into said space, said tube with said radiation sink material completely filling said space;
   and directing corpuscular radiation beams from opposed sides of said joint and welding said workpieces together.

2. The process of claim 1, wherein said space is formed by forming a rounded elongated groove in the contact area of each of said workpieces, said grooves being positioned opposite each other when said workpieces are positioned to be welded to form said welded joint, and locating said tube in said groove; and wherein said corpuscular radiation is a beam of electrons.

3. Method according to claim 1, wherein said metal tube is filled with radiation sink material in powder form.

4. Method according to claim 1 wherein said radiation sink material comprises lead, lead alloys and pulverous silicates mixed with iron powder.

* * * * *

UNITED STATES PATENT OFFICE
CERTIFICATE OF CORRECTION

Patent No. 3,679,862   Dated July 25, 1972

Inventor(s) Albert STOLL and Walter WANKA

It is certified that error appears in the above-identified patent and that said Letters Patent are hereby corrected as shown below:

On the upper part of the right column of the title page, insert the following:

--[56]   References Cited
UNITED STATES PATENTS 3,436,515   10/1965   Sayer, et al.......219/121EB

BRITISH PATENTS 1,031,801   6/1966   United Aircraft....219/121EB

OTHER REFERENCES

Welding Engineer, 7/1962, page 52
"Inert Gas Replaces EB Welding Vacuum"--

Signed and sealed this 9th day of January 1973.

(SEAL)
Attest:

EDWARD M. FLETCHER, JR.
Attesting Officer

ROBERT GOTTSCHALK
Commissioner of Patents